United States Patent Office 3,557,100
Patented Jan. 19, 1971

---

3,557,100
CERTAIN DECAHYDRO AND DODECAHYDRO-5H-PYRIDO[1,2-a] - 1,6 - NAPHTHYRIDINE - 5 - ONES, THE CORRESPONDING - 5 - OLS AND DERIVATIVES THEREOF
Meier E. Freed, Philadelphia, Pa., and John L. Archibald, Windsor, England, assignors to American Home Products Corporation, New York, N.Y., a corporation of Delaware
No Drawing. Continuation-in-part of application Ser. No. 599,404, Dec. 6, 1966. This application June 11, 1969, Ser. No. 832,490
Int. Cl. C07d 39/10
U.S. Cl. 260—240       18 Claims

ABSTRACT OF THE DISCLOSURE

This invention relates to decahydro and dodecahydro-5H - pyrido[1,2-a]-1,6-naphthyridine compounds, their substituents, and a process for their preparation. The compounds are useful in pharmacology as antiandrogenic, analgesic and central nervous system depressant agents.

---

This application is a continuation-in-part of application Ser. No. 599,404, filed Dec. 6, 1966, and now abandoned.

This invention relates to and has for its objects the provision of new physiologically active compounds, novel process for their production and new intermediates useful in the preparation thereof.

More particularly, this invention relates to compounds of the Formula I:

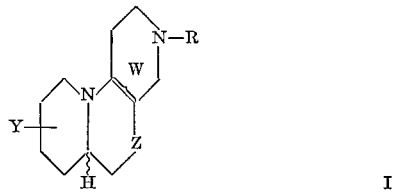

I and the pharmaceutically acceptable acid-addition salts thereof, wherein ⁓ represents the alpha or beta position; W represents a double-bond or a saturated linkage between C–4a and C–11a; Y represents hydrogen or lower alkyl; R represents hydrogen, lower alkyl, acyl, alkenyl, alkynyl, cyclohexyl, diphenyl lower akyl, di(lower alkyl) amino lower alkyl, aroyl (e.g., benzoyl), aralkyl (e.g., benzyl) and aryloxy lower alkyl; and Z represents

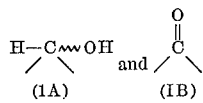

Among the suitable acyls may be mentioned the acyl radical of a hydrocarbon carboxylic acid of less than 12 carbon atoms, as exemplified by the lower alkanoic acids (e.g., acetic, propionic, butylric, hexanoic and enanthic acid), the lower alkenoic acids, the cycloalkane carboxylic acids (e.g., cyclobutane carboxylic acid, the monocyclic aromatic carboxylic acids (benzoic), and the monocyclic aryl lower alkanoic acids (e.g., phenacetic and β-phenylpropionic acid).

The terms "lower alkyl," "lower alkenyl" and "lower alkynyl" as employed herein include both straight and branched groups having less than 8 carbon atoms.

Among the suitable acid-addition salts include, inter alia, inorganic acids, such as the hydrohalic acids (e.g., hydrochloric and hydrobromic acid), sulphuric acid, nitric acid, boric acid and phosphoric acid, and organic acids such as oxalic, fumaric, tartaric, citric, acetic, succinic and maleic acid.

The compounds of this invention are therapeutically active substances which are useful as antiandrogenic, analgesic and central nervous system depressant agents, and thus can be administered perorally or parenterally.

In the pharmacological evaluation of the biological activity of the compounds of this invention, the in vivo effects are tested as follows. The compound is administered orally or intraperitoneally to three mice (14 to 24 grams) at each of the following doses: 400, 127, 40 and 12.7 mg./kg. The animals are watched for a minimum of two hours during which time signs of general stimulation, (i.e., increased spontaneous motor activity, hyperactivity on tactile stimulation, twitching), general depression (i.e., decreased spontaneous motor activity, decreased respiration) autonomic acitvity (i.e., miosis, mydriasis, diarrhea) are noted.

The decahydro and dodecahydro-5H-pyrido[1,2-a]-1,6-naphthyridine compounds of this invention in the above procedure, among other activities, induce decreased motor activity.

For preparing pharmaceutical compounds from the physiologically active compounds of this invention pharmaceutically acceptable carriers can be either solid or liquid. Solid form preparations include powders, tablets, dispersible granules, capsules, cachets, and suppositories. A solid carrier can be one or more substances which may also act as diluents, flavoring agents, solubilizers, lubricants, suspending agents, binders or tablet disintegrating agents: it can also be an encapsulating material. In powders the carrier is a finely divided solid which is in admixture with the finely divided compound. In the tablets the compound is mixed with carrier having the necessary binding properties in suitable proportions and compacted in the shape and size desired. The powders and tablets preferably contain from 5 or 10 to 99% of the active ingredient. Suitable solid carriers are magnesium carbonate, magnesium stearate, talc, sugar, lactose, pectin, dextrin, starch, gelatin, tragacanth, methyl cellulose, sodium carboxymethyl cellulose, a low melting wax and cocoa butter. The term "preparation" is intended to include the formulation of the compound with encapsulating material as carrier providing a capsule in which the compound (with or without other carriers) is surrounded by carrier, which is thus in association with it. Similarly, cachets are included. Tablets, powders, cachets and capsules can be used for oral administration.

Liquid form preparations include solutions, suspensions and emulsions. As an example may be mentioned water-propylene glycol solutions for parenteral injection. Liquid preparations can also be formulated in solution in aqueous polyethylene glycol solutions. Aqueous suspensions suitable for oral use can be made by dispensing the finely divided compound in water with viscous material, natural or synthetic gums, resins, etc., for example, gum arabic, ion-exchange resins, methyl cellulose, sodium carboxymethyl cellulose and other well known suspending agents.

Preferably the pharmaceutical preparation is in unit dosage form. In such form, the preparation is subdivided in unit doses containing appropriate quantities of the compound: the unit dosage form can be a packaged preparation, the package containing discrete quantities of preparation, for example, packeted powders of vials or ampules.

The unit dosage form can be a capsule, cachet or tablet itself or it can be the appropriate number of any of these in packaged form. The quantity of compound in a unit dose of preparation may be varied or adjusted from a 1 mg. to 100 mg. (generally within the range of 5 to 25 mg.) according to the particular application and the potency of the active ingredient.

The claimed compositions have physiological activity and can be incorporated into pharmaceutical formulations including sustained-release agents.

The compounds of this invention may be prepared by a variety of methods. One suitable method may be represented by the following equations wherein Y and R are as hereinbefore defined:

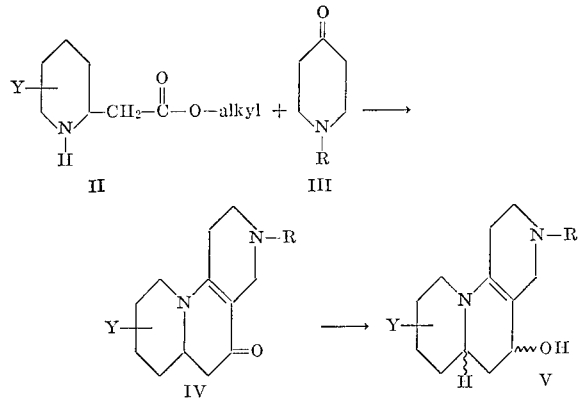

According to a feature of this invention, an alkyl piperidyl-2-acetate compound of Formula II is reacted with a piperidone compound of Formula III, preferably in an inert organic solvent (e.g., benzene, xylene, toluene) at the reflux temperature of the mixture to form the decahydro - 5H - pyrido[1,2-a]-1,6-naphthyridin-5-one compounds of Formula IV, which are final products of this invention. The piperidone compounds which are required are available commercially or can be readily prepared by methods well known in the art.

In accordance with another feature of this invention, the decahydro-5H-pyrido[1,2-a]-1,6-naphthyridin - 5 - one compounds (IV) are reduced by any conventional method, such as with sodium borohydride or lithium aluminum hydride or catalytic hydrogenation using a precious metal catalyst, so as to form a 5-hydroxylated compound (V) having a saturated linkage between C–4a and C–11a. However, the compounds of Formula IV may be partially reduced so as to recover the 5-keto compounds having a saturated linkage between C–4a and C–11a.

In accordance with another feature of this invention, final products of this invention may be prepared by treating the compounds of Formula V, wherein R is hydrogen, with an alkyl halide, alkenyl halide or alkynyl halide to yield the corresponding 3-N-substituted alkyl, alkenyl or alkynyl derivative.

The following examples illustrate the invention (all temperatures being in centigrade).

EXAMPLE 1

1,2,3,4,6,6a,7,8,9,10-decahydro-3-methyl-5H-pyrido [1,2-a][1,6]naphthyridin-5-one A solution of 15.7 gm. of methyl piperidyl-2-acetate and 12.4 gm. of methyl-4-piperidone in 30 ml. of toluene is refluxed, using a Dean-Stark water separator, for 22 hours. When no more water is distilled from the reaction, the toluene is distilled out at atmospheric pressure and the residue distilled in vacuo. The fraction distilling from 125° C. to 175° C./0.2 mm. is collected. On standing a small amount of solid appeared in the distillate. This is filtered from the distillate and washed well with ether. The filtrate, after concentration, deposited yellow prisms of 1,2,3,4,6,6a,7,8,9,10 - decahydro - 3 - methyl-5H-pyrido [1,2-a][1,6]naphthyridin-5-one, having a melting point of 102–4° C.

*Analysis.*—Calcd. for $C_{13}H_{20}ON_2$ (percent): C, 70.87; H, 9.15; N, 12.72. Found (percent): C, 71.07; H, 9.34; N, 12.50.

In the above-described pharmacological evaluation, the compound induced decreased motor activity at a dose of 127 milligrams per kilogram of host body weight (mg./kg.) administered orally.

EXAMPLE 2

1,2,3,4,6,6a,7,8,9,10-decahydro-3-propyl-5H-pyrido [1,2-a][1,6]naphthyridin-5-one Following the procedure of Example 1, but substituting N-propyl-4-piperidone for N-methyl-4-piperidone there is obtained 1,2,3,4,6,6a,7,8,9,10 - decahydro - 3-propyl-5H-pyrido[1,2-a][1,6]naphthyridin-5-one.

EXAMPLE 3

1,2,3,4,6,6a,7,8,9,10-decahydro-3-butyl-5H-pyrido [1,2-a][1,6]naphthyridin-5-one Following the procedure of Example 1, but substituting N-butyl-4-piperidone for N-methyl-4-piperidone there is obtained 1,2,3,4,6,6a,7,8,9,10 - decahydro - 3-butyl-5H-pyrido[1,2-a][1,6]naphthyridin-5-one.

EXAMPLE 4

1,2,3,4,6,6a,7,8,9,10-decahydro-3-(2-diethylaminoethyl)-5H-pyrido[1,2-a][1,6]naphthyridin-5-one Following the procedure of Example 1, but substituting N-(2-diethylaminoethyl)-4-piperidone for N-methyl-4-piperidone there is obtained 1,2,3,4,6,6a,7,8,9,10-decahydro-3-(2-diethylaminoethyl) - 5H - pyrido[1,2-a] [1,6]naphthyridin-5-one.

EXAMPLE 5

1,2,3,4,6,6a,7,8,9,10-decahydro-3-benzhydryl-5H-pyrido[1,2-a][1,6]naphthyridin-5-one Following the procedure of Example 1, but substituting N-benzhydryl-4-piperidone for N-methyl-4-piperidone there is obtained 1,2,3,4,6,6a,7,8,9,10-decahydro-3-benzhydryl-5H-pyrido[1,2-a][1,6]naphthyridin-5-one.

EXAMPLE 6

1,2,3,4,6,6a,7,8,9,10-decahydro-3-(2-diphenylethyl)-5H-pyrido[1,2-a][1,6]naphthyridin-5-one Following the procedure of Example 1, but substituting N-(2-diphenylethyl)-4-piperidone for N-methyl-4-piperidone there is obtained 1,2,3,4,6,6a,7,8,9,10-decahydro-3-(2-diphenylethyl) - 5H - pyrido[1,2-a][1,6]naphthyridin-5-one.

EXAMPLE 7

1,2,3,4,5,6a,7,8,9,10-decahydro-5H-pyrido[1,2-a][1,6] naphthyridin-5-one

Following the procedure of Example 1, but substituting piperidine-4-one for N-methyl-4-piperidone there is obtained 1,2,3,4,6,6a,7,8,9,10-decahydro-5H-pyrido[1,2-a] [1,6]naphthyridin-5-one.

EXAMPLE 8

1,2,3,4,6,6a,7,8,9,10-decahydro-3-methyl-10-ethyl-5H-pyrido[1,2-a][1,6]naphthyridine-5-one Following the procedure of Example 1, but substituting methyl-6-ethyl-piperidyl-2-acetate for methyl piperidyl-2-acetate there is obtained 1,2,3,4,6,6a,7,8,9,10-decahydro-3-methyl-10-ethyl - 5H - pyrido[1,2-a][1,6]naphthyridin-5-one.

EXAMPLE 9

3-benzoyl-1,2,3,4,6,6a,7,8,9,10-decahydro-5H-pyrido [1,2-a][1,6]naphthyridin-5-one A mixture of 37.4 gm. of N-benzoylpiperidine-4-one and 31.5 gm. of methyl-2-piperidyl acetate in 45 ml. of xylene is heated under reflux, using a Dean-Stark trap for 22 hours. After water and methanol ceases to appear in the trap, the xylene is removed under vacuum and the residue is crystallized from ethyl acetate. The product amounted to 26.1 gms. (41.8%) of 3-benzoyl-1,2,3,4,6, 6a,7,8,9,10-decahydro - 5H - pyrido[1,2-a][1,6]naphthyridin-5-one. A sample, recrystallized from ethyl acetate, had a melting point of 143–144° C.

*Analysis.*—Calcd. for $C_{19}H_{22}N_2O_2$ (percent): C, 73.52; H, 7.14; N, 9.03. Found (percent): C, 73.29; H, 7.07; N, 8.96.

In the above-described pharmacological evaluation, the compound induced decreased motor activity at a dose of 40 mg./kg. administered intraperitoneally.

EXAMPLE 10

3-acetyl-1,2,3,4,6,6a,7,8,9,10-decahydro-5H-pyrido[1,2-a][1,6]naphthyridin-5-one Following the procedure of Example 9, but substituting 6-acetylpiperidine-4-one for N-benzoylpiperidine-4-one there is obtained 3-acetyl-1,2,3,4,6,6a,7,8,9,10-decahydro-5H-pyrido[1,2-a][1,6]naphthyridin-5-one.

EXAMPLE 11

3-phenoxyethyl-1,2,3,4,6,6a,7,8,9,10-decahydro-5H-pyrido[1,2-a][1,6]naphthyridin-5-one Following the procedure of Example 9, but substituting N-phenoxyethyl-piperidine-4-one for N-benzoylpiperidine-4-one there is obtained 3-phenoxyethyl-1,2,3,4,6,6a,7,8,9,10-decahydro-5H-pyrido[1,2-a][1,6]naphthyridin-5-one.

EXAMPLE 12

3-benzyldodecahydro-5H-6aα-pyrido[1,2,a][1,6]naphthyridin-5-one

A solution of 3.1 gm. of 1,2,3,4,6,6a,7,8,9,10-decahydro-3-benzoyl - 5H - pyrido[1,2-a][1,6]naphthyridin-5-one in 100 ml. of dry tetrahydrofuran is added dropwise to a well stirred suspension of 0.76 gm. of lithium aluminum hydride in 50 ml. of dry tetrahydrofuran. The reaction mixture is heated 4 hours, cooled and decomposed by the addition of water. The mixture is then filtered and the filter-cake is washed with tetrahydrofuran. The filtrate is concentrated leaving a colorless oil which crystallized on standing yields 3 gms. of solid. Two recrystallizations from ethyl acetate yields 0.6 gm. of 3-benzyldodecahydro - 5H - 4aβ,6aα,11aα-pyrido[1,2-a][1,6]naphthyridin-5-ol having a melting point of 184–187°.

*Analysis.*—Calcd. for $C_{19}H_{28}N_2O$ (percent): C, 75.95; H, 9.39; N, 9.33. Found (percent): C, 75.76; H, 9.45; N, 9.46.

The filtrates from the above isolation of 3-benzyldodecahydro - 5H - 4aβ,6aα,11aα - pyrido[1,2-a][1,6]naphthyridin-5-ol, is concentrated and on standing deposited further crystals melting 115–125°. Recrystallization from cyclohexane yields 3-benzyldodecahydro-5H-6aα-pyrido[1,2-a][1,6]naphthyridin-5-one having a melting point of 125–129°.

*Analysis.*—Calcd. for $C_{19}H_{26}N_2O$ (percent): C, 76.47; H, 8.78; N, 9.39. Found (percent): C, 76.53; H, 8.94; N, 9.63.

In the above-described pharmacological evaluation, the latter compound induced decreased motor activity at a dose of 40 mg./kg. administered intraperitoneally.

EXAMPLE 13

1,2,3,4,6,6a,7,8,9,10-decahydro-5H-6aα-pyrido[1,2-a][1,6]naphthyridin-5-one, hemifumarate 5.0 gm. of 1,2,3,4,6,6a,7,8,9,10-decahydro-3-benzoyl-5H-6aα-pyrido[1,2-a][1,6]naphthyridin-5-one is refluxed in 25 ml. of 2 N hydrochloric acid for 3 hours. The mixture is cooled and benzoic acid is filtered off and washed with water. The filtrate is partly neutralized (pH 4) and a small amount of tar separates, that is removed by decantation. The supernatant solution is treated with solid potassium carbonate (pH 9–10) and an oil separates which is extracted into methylenedichloride, and dried over magnesium sulfate. After filtering, the filtrate is concentrated to a brown oil that is taken up in acetone and a solution of fumaric acid in acetone is added until acidic. The precipitate is filtered off, washed with acetone and dried. Recrystallization from ethanol yields 1.4 gms. of 1,2,3,4,6,6a,7,8,9,10-decahydro-5H-6aα - pyrido[1,2-a][1,6]naphthyridin-5-one, hemifumarate, having a melting point of 226° C.

*Analysis.*—Calcd. for $C_{14}H_{20}N_2O_3$ (percent): C, 63.61; H, 7.63; N, 10.60. Found (percent): C, 63.33; H, 7.36; N, 10.80.

In the above-described pharmacological evaluation, the compound induced decreased motor activity at a dose of 127 mg./kg. administered intraperitoneally.

EXAMPLE 14

3-benzoyldodecahydro-5H-4aβ,6aα,11aα-pyrido[1,2-a][1,6]naphthyridin-5β-ol

To 2 gms. of -benzoyl-1,2,3,4,6,6a,7,8,9,10-decahydro-5H-pyrido[1,2-a][1,6]naphthyridin-5-one is dissolved in 25 ml. of dimethylformamide and added dropwise a cold solution of sodium borohydride in 25 ml. of water. The reaction mixture is stirred at room temperature overnight, diluted with water (50 ml.) and acidified with acetic acid. The solution is taken to dryness under vacuum and the residue is triturated with ether and the ether portion is decanted off. The residue is dissolved in water and the solution is made basic (pH 8–9) and extracted with dichloromethane. The solution is washed with saline, dried over sodium sulfate and filtered. The solvent is removed by evaporation in vacuo leaving a solid residue (1.7 gm.). This residue is recrystallized from acetone to yield 3-benzoyldodecahydro - 5H - 4aβ,6aα,11aα-pyrido[1,2-a][1,6]naphthyridin-5β-ol having a melting point of 202–203° C.

*Analysis.*—Calcd. for $C_{19}H_{26}N_2O_2$ (percent): C, 72.58; H, 8.34; N, 8.91. Found (percent): C, 72.33; H, 8.48; N, 8.97.

In the above-described pharmacological evaluation, the compound induced decreased motor activity at a dose of 40 mg./kg. administered intraperitoneally.

EXAMPLE 15

Dodecahydro-5H-6aα-pyrido[1,2-a][1,6]naphthyridin-5(ξ)-ol, dihydrochloride

A solution of 2.2 gm. of 3-benzoyldodecahydro-5H-6aα-pyrido[1,2-a][1,6]naphthyridin-5-ol in 20 ml. of hydrochloric acid (2.5 N) is heated under reflux for 6 hours. After cooling the precipitate of benzoic acid is filtered off and washed with cold water. The filtrate is evaporated to dryness in vacuo. The solid residue is dissolved in 70 ml. of hot methanol, concentrated to ½ volume, and 35 ml. of acetone is added. The product separates out as a white crystalline material. This was filtered off and dried to yield 1.23 gm. of dodecahydro-5H-6aα-pyrido[1,2-a][1,6]naphthyridin-5(ξ)-ol, dihydrochloride (64.5%) having a melting point >325 (dec.).

*Analysis.*—Calcd. for $C_{12}H_{22}N_2O \cdot 2HCl$ (percent): C, 50.90; H, 8.55; N, 9.90; Cl, 25.20. Found (percent): C, 51.05; H, 8.80; N, 9.52; Cl, 25.30.

EXAMPLE 16

3-allyl-dodecahydro-5H-6aα-pyrido[1,2-a][1,6]naphthyridin-5-ol

A solution of 3.3 gm. of dodecahydro-5H-6aα-pyrido[1,2-a][1,6]naphthyridin-5-ol, dihydrochloride and 7 gm. of diisopropylamine in 25 ml. of dimethylformamide is stirred 3 hours. Allyl bromide (1.7 gms.) is added dropwise and the reaction mixture is stirred 16 hours. A precipitate forms (diisopropylamine salts) which is filtered off. The filtrate is concentrated to an oil which deposited additional crystalline material on standing. The residue is triturated with acetone and the solid filtered off. This filtrate is again concentrated, leaving 2.2 gms. of solid which is taken up in ethanol and made just acidic with ethanolic hydrogen chloride. Acetone is added until crystallization occurs. The product is filtered off, washed with acetone and dried to yield 1.0 gm. of 3-allyldodecahydro- 5H - 6aα - pyrido[1,2-a][1,6]naphthyridin-5-ol having a melting point of 298–300° C.

*Analysis.*—Calcd. for $C_{15}H_{26}N_2O \cdot 2HCl \cdot H_2O$ (percent): C, 52.75; H, 8.86; N, 8.21; Cl, 20.75. Found (percent): C, 52.95; H, 8.85; N, 8.31; Cl. 20.4.

EXAMPLE 17

3-(3,3-diphenyl)propyl-dodecahydro-5H-4aα-6aα-11α-pyrido[1,2-a][1,6]naphthyridin-5-ol, hydrochloride To a mixture of 4.2 gm. of dodecahydro-5H-4aα,6aα,11aα-pyrido[1,2-a][1,6]naphthyridin-5-β-ol and 2.8 gm. of potassium carbonate in 100 ml. 2-propanol, is added a solution of 3,3-diphenylpropyl bromide. The reaction mixture is heated under reflux and stirred for 26 hours. After cooling, the solvent is removed in vacuo and the residue partitioned between water and methylenedichloride. The organic phase is washed with saline and dried over sodium sulfate. After filtering the solution is treated with gaseous hydrogen chloride. A precipitate forms and is filtered off.

The filtrate is concentrated to remove methylene-dichloride, then diluted with ether. A hygroscopic precipitate resulted. The supernatant liquid is decanted away and the residue is then crystallized from ethanol to yield 3.6 grams of 3 - (3,3 - diphenyl)propyl-dodecahydro-5H-4aα-6aα - 11aα - pyrido[1,2-a][1,6]naphthyridin-5-ol, hydrochloride having a melting point of 290–291°.

EXAMPLE 18

Propargyldodecahydro-5H-4aβ-6aα-11aα-pyrido[1,2-a][1,6] naphthyridin-5-ol

A mixture of 3.0 gm. of dodecahydro-2H-6aα-pyrido-[1,2a]-1,6-naphthyridin-5-β-ol, 1.75 gm. of triethylamine and 75 ml. of dimethylformamide is heated to obtain a clear solution, cooled to 25° C. and a solution of 1.87 gm. of propargylbromide in 10 ml. dimethylformamide is added in 10 minutes. A slight exotherm results. The solution is stirred at room temperature for 20 hours and then heated at 60° C. for 7 hours. The mixture is cooled and the solvent removed in vacuo. The residue is recrystallized first from acetone, then from acetonitrile to yield 0.95 gm. of propargyldodecahydro - 5H-4aβ-6aα-11aα-pyrido[1,2-a][1,6]naphthyridin-5-ol having a melting point of 169–172° C.

*Analysis.*—Calcd. for $C_{15}H_{24}N_2O$ (percent): C, 72.54; H, 9.74; N, 11.28. Found (percent): C, 72.46; H, 9.91; N, 11.50.

The base was converted to the hydrochloride in ethanol in a conventional manner. Recrystallization from ethanol-ether gave the hydrochloride as the hydrate melting at 249–250° C.

*Analysis.*—Calcd. for $C_{15}H_{26}Cl_2N_2O \cdot H_2O$ (percent): C, 53.08; H, 8.02; Cl, 20.89; N, 8.25. Found (percent): C, 53.18; H, 8.19; Cl, 20.90; N, 8.41.

Following the procedure of any of Examples 16 through 18, but substituting another alkenyl halide, an alkyl halide or alkynyl halide for allyl bromide, propargylbromide or diphenylpropyl bromide, there is obtained the corresponding alkenyl, alkyl or alkynyl radical in the 3-position.

EXAMPLE 19

*dl*-Dodecahydro-3-(2-phenoxyethyl)-5H-4aβ,,6aα-11aα-pyrido[1,2-a][1,6]naphthyridin-5β-ol A solution of β-bromophenetole (6.32 g., 0.0314 mole) in dimethoxyethane (75 ml.) was added at reflux, over a period of 1 hour, to a mixture of *dl*-dodecahydro-5H-4aβ,6aα,11aα-pyrido[1,2-a][1,6]naphthyridin-5β-ol (6.0 g., 0.0285 mole), triethylamine (3.18 g., 0.0314 mole) and dimethoxyethane (75 ml.). The mixture was refluxed for 27 hours after the addition had been completed. It was then cooled, filtered and the solid washed with dimethoxyethane. The filtrate and washings were combined and freed of solvent. The residue was recrystallized from acetone to give the product, 4.73 g. (50.2% yield) melting at 141–146° C. A small sample, recrystallized from acetone, melted at 145–147° C.

*Analysis.*—Calcd. for $C_{20}H_{30}N_2O_2$ (percent): C, 72.69; H, 9.15; N, 8.48. Found (percent): C, 72.89; H, 9.00; N, 8.75.

A 3.73 g. sample of the base was converted to the dihydrochloride by treating its ethanolic solution with saturated ethanolic hydrogen chloride to pH 1. The product obtained on adding ether was collected and recrystallized from methanolacetone to give the dihydrochloride, 3.98 g. melting at 293–295° C.

*Analysis.*—Calcd. for $C_{20}H_{32}Cl_2N_2O_2$ (percent): C, 59.55; H, 8.00; Cl, 17.57; N, 6.95. Found (percent): C, 59.64; H, 7.89; Cl, 17.59; N, 6.98.

In the above-described pharmacological evaluation, the latter compound induced decreased motor activity at a dose of 127 mg./kg. administered intraperitoneally.

EXAMPLE 20

*dl*-3-cinnamyldodecahydro-5H-4aβ,6aα,11aα-pyrido[1,2-a][1,6]naphthyridin-5β-ol

A solution of cinnamyl bromide (3.1 g., 0.01568 mole) in isopropyl alcohol (40 ml.) was added at reflux to a solution of *dl*-dodecahydro-5H-4aβ,6aα,11aα-pyrido[1,2-a][1,6]naphthyridin-5β-ol (3.0 g., 0.01426 mole) and triethylamine (1.75 g., 0.01568 mole) in isopropyl alcohol (40 ml.). The mixture was refluxed for 27 hours after the addition had been completed. It was then cooled and freed of solvent. The residue was extracted with boiling acetone (300 ml.). The extracts were concentrated to a volume of about 50 ml., then diluted with ether (75 ml.). The resulting solid was filtered off. The filtrate was freed of solvent and the residue recrystallized three times from acetone to give the product, 0.93 g. (21.8% yield), melting at 157–158° C.

*Analysis.*—Calcd. for $C_{21}H_{30}N_2$ (percent): C, 77.25; H, 9.26; N, 8.58. Found (percent): C, 76.99; H, 9.23; N, 8.35.

In the above-described pharmacological evaluation, the compound induced decreased motor activity at a dose of 127 mg./kg. administered orally.

EXAMPLE 21

*dl*-3-(2-methylallyl)dodecahydro-5H-4aβ,6aα-11aα-pyrido[1,2-a][1,6]naphthyridin-5β-ol A solution of β-methallyl chloride (1.43 g., 0.01568 mole) in isopropyl alcohol (40 ml.) was added at reflux, over a period of 20 minutes, to a solution of *dl*-dodecahydro-5H-4aβ,6aα,11aα-pyrido[1,2-a][1,6]naphthyridin-5β-ol (3.0 g., 0.01426 mole) and triethylamine (1.75 g., 0.01568 mole) in isopropyl alcohol (40 ml.). The mixture was refluxed for 26 hours after the addition had been completed. It was then cooled and freed of solvent. Recrystallization of the residue from acetone then from methanol-acetone gave the product monohydrochloride. Its ethanolic solution was treated with ethanolic hydrogen chloride solution. Crystallization of the dihydrochloride was induced by the addition of ether. It was collected as the hemihydrate, 2.63 g. (53.2% yield) melting at 274–275° C. (decomposed).

*Analysis.*—Calcd. for $C_{16}H_{30}Cl_2N_2O \cdot \frac{1}{2}H_2O$ (percent): C, 55.50; H, 9.03; Cl, 20.48; N, 8.09. Found (percent): C, 56.06; H, 8.81; Cl, 20.66; N, 7.72.

In the above-described pharmacological evaluation, the compound induced decreased motor activity at a dose of 400 mg./kg. administered intraperitoneally.

EXAMPLE 22

*dl*-3-(2-butenyl)-dodecahydro-5H-4aβ,6aα,11aα-pyrido[1,2-a][1,6]naphthyridin-5β-ol A solution of crotyl bromide (4.24 g., 0.0314 mole) isopropyl alcohol (40 ml.) was added at reflux, over a period of ¾ hour, to a mixture of *dl*-dodecahydro-5H-4aβ,6aα,11aα - pyrido[1,2-a][1,6]naphthyridin-5β-ol (6.0 g., 0.0285 mole) and potassium carbonate (10.36 g., 0.075 mole) in isopropyl alcohol (75 ml.). The mixture was refluxed for 25½ hours after the addition had been completed. It was then cooled and filtered. The solid was washed. The filtrate and washings were combined and freed of solvent. The residue was recrystallized from acetone to give the product, 3.28 g. (43.5% yield) melting at 140–143° C. A small sample was recrystallized further from acetone to give a solid melting at 144.5–146° C.

*Analysis.*—Calcd. for $C_{16}H_{28}N_2O$ (percent): C, 72.68; H, 10.67; N, 10.60. Found (percent): C, 72.89; H, 10.36; N, 10.38.

A sample (0.5 g.) of the base was converted to the hydrochloride by treating its ethanolic solution with saturated ethanolic hydrogen chloride to pH 1. The product was collected and recrystallized from ethanol to give 0.19 g. melting at 316–317° C. (decomposed).

*Analysis.*—Calcd. for $C_{16}H_{30}Cl_2N_2O$ (percent): C, 56.95; H, 8.97; Cl, 21.02; N, 8.31. Found (percent): C, 57.00; H, 8.78; Cl, 20.82; N, 8.18.

EXAMPLE 23 dl-dodecahydro-3-(3-methyl-2-butenyl)-5H-4aβ,6aα, 11aα-pyrido[1,2-a][1,6]naphthyridin-5β-ol A solution of gamma,gamma-dimethylallyl bromide (4.65 g., 0.0314 mole) in isopropyl alcohol (40 ml.) was added at reflux, over a period of 1½ hours, to a mixture dl - dodecahydro - 5H - 4aβ,6aα,11aα-pyrido[1,2-a][1,6] naphthyridin-5β-ol (6.0 g., 0.0285 mole), potassium carbonate (10.36 g., 0.075 mole) and isopropyl alcohol (75 ml.). The mixture was refluxed for 25¼ hours after the addition had been completed. It was then cooled, filtered and the solid washed with isopropyl alcohol. The filtrate and washings were combined and freed of solvent. The residue was recrystallized three times from acetone to give the product, 4.61 g. (58% yield) melting at 126–131° C.

*Analysis.*—Calcd. for $C_{17}H_{30}N_2O$ (percent): C, 73.33; H, 10.86; N, 10.06. Found (percent): C, 72.81; H, 10.93; N, 10.06.

A 0.5 g. sample of the base was converted to the dihydrochloride by treating its ethanolic solution with saturated ethanolic hydrogen chloride. The product obtained on adding ether was collected and recrystallized from methanol-acetone to give the dihydrochloride as the hydrate, 0.47 g. melting at 342–344° C.

*Analysis.*—Calcd. for $C_{17}H_{32}Cl_2N_2O \cdot H_2O$ (percent): C, 55.30; H, 9.28; Cl, 19.18; N, 7.58. Found (percent): C, 54.89; H, 8.97; Cl, 18.73; N, 7.79.

In the above-described pharmacological evaluation, the latter compound induced decreased motor activity at a dose of 400 mg./kg. administered intraperitoneally.

EXAMPLE 24

3-benzoyldodecahydro-5H-pyrido[1,2-a][1,6] naphthyridin-5-one

3 - benzoyldecahydro - 5H-4aβ,6aα,11aα-pyrido[1,2-a][1,6]naphthyridin-5-one (3.1 grams), 12 ml. 1.0 N hydrochloric acid and 12 ml. ethanol were added to prehydrogenated platinum oxide (100 milligrams) in 50% aqueous ethanol (50 ml.). Hydrogenation was carried out at 1 atmosphere and room temperature in a quantitative hydrogenation apparatus. The hydrogenation was stopped after absorption of 1 mole of hydrogen (90 minutes). After filtering off the catalyst the filtrate was concentrated under reduced pressure. The residue was dissolved in water, filtered clear, and cooled. The solution was made basic with potassium carbonate, and the oil was extracted with methylenedichloride. The extracts were dried over magnesium sulfate, filtered, and concentrated to an oil. Crystallization from cyclohexane yielded 1.7 g. of a colorless product having a melting point of 117–120° C.

*Analysis.*—Calcd. for $C_{19}H_{24}N_2O_2$ (percent): C, 73.04; H, 7.74; N, 8.97. Found (percent): C, 73.14; H, 7.59; N, 8.79.

In the above-described pharmacological evaluation, the compound induced decreased motor activity at a dose of 400 mg./kg. administered orally.

EXAMPLE 25

3-benzyl-5H-4aβ,6aα,11aα-dodecahydro-pyrido [1,2-a][1,6]naphthyridin-5α-ol

3 - benzoyldodecahydro-5H-4aβ,6aα,11aα-pyrido[1,2-a][1,6]naphthyridin-5α-ol (2.3 grams) in 100 ml. dry tetrahydrofuran was added to a stirred suspension of lithium aluminum hydride (0.84 gram, 0.022 mole) in 25 ml. of the same solvent. After stirring and refluxing 4 hours, the reaction mixture was cooled and decomposed by the cautious addition of 3 ml. water. After filtering, the filtrate was concentrated, and the residue recrystallized from ethyl acetate yielding 1 g. of product having a melting point of 142–144° C.

*Analysis.*—Calcd. for $C_{19}H_{28}N_2O$ (percent): C, 75.95; H, 9.39; N, 9.33. Found (percent): C, 75.75; H, 9.23; N, 9.53.

In the above-described pharmacological evaluation, the compound induced decreased motor activity at a dose of 127 mg./kg. administered intraperitoneally.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A compound selected from the group consisting of those having the formula:

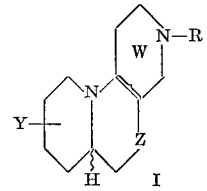

and the pharmaceutically acceptable acid-addition salts, wherein W is selected from the group consisting of a double-bond and a saturated linkage between C–4a and C–11a; Y is selected from the group consisting of hydrogen and lower alkyl; R is selected from the group consisting of hydrogen, lower alkyl, acetyl, propionyl, butyryl, hexanoyl, enanthoyl, lower alkenyl of 3–5 carbon atoms, propargyl, diphenyl lower alkyl, di(lower alkyl)amino lower alkyl, benzoyl, benzyl and 2 phenoxyethyl; and Z is selected from the group consisting of:

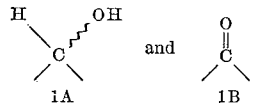

2. A compound according to claim 1 having the structure

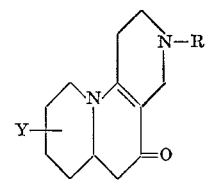

wherein R is selected from the group consisting of hydrogen, lower alkyl, acetyl, propionyl, butyryl, hexanoyl, enanthoyl, lower alkenyl of 3–5 carbon atoms, propargyl, diphenyl lower alkyl, di(lower alkyl)amino lower alkyl, benzoyl, benzyl and 2 phenoxyethyl; and Y is selected from the group consisting of hydrogen and lower alkyl.

3. A compound according to claim 2 that is: 1,2,3,4,6,6a,7,8,9,10-decahydro-3-methyl - 5H - pyrido[1,2-a][1,6]naphthyridin-5-one.

4. A compound according to claim 1 that is: 3-benzyl-dodecahydro - 5H - 6aα-pyrido[1,2-a][1,6]naphthyridin-5-one.

5. A compound according to claim 1 that is: 3-benzyl-dodecahydro - 5H - 6aα-pyrido[1,2-a][1,6]naphthyridin-5-ol.

6. A compound according to claim 1 that is: 1,2,3,4,6,6a,7,8,9,10 - decahydro - 5H - 6aα-pyrido[1,2-a][1,6]naphthyridin-5-one.

7. A compound according to claim 1 that is: 3-benzoyl-dodecahydro - 5H - 6aα-pyrido[1,2-a][1,6]naphthyridin-5-ol.

8. A compound according to claim 1 that is: dodecahydro-5H-6aα-pyrido[1,2-a][1,6]naphthyridin-5-ol.

9. A compound according to claim 1 that is: 3-(3,3-diphenyl)propyl-dodecahydro - 5H - 4aα-6aα-11aα-pyrido-[1,2-a][1,6]naphthyridin-5-ol.

10. A compound according to claim 1 that is: 3-propargyl-dodecahydro - 5H - 4aα-6aα-11aα-pyrido[1,2-a][1,6]naphthyridin-5-ol.

11. A compound according to claim 1 that is: 3-lower alkenyl of 3–5 carbon atoms dodecahydro-5H-6aα-pyrido[1,2-a][1,6]naphthyridin-5-ol.

12. A compound according to claim 1 that is: 3-allyl-dodecahydro - 5H - 6aα-pyrido[1,2-a][1,6]naphthyridin-5-ol.

13. A compound according to claim 1 that is: dl-dodecahydro - 3 - (2 - phenoxyethyl)-5H-4aβ,6aα,11aα-pyrido[1,2-a][1,6]naphthyridin-5β-ol.

14. A compound according to claim 1 that is: dl-3-cinnamyldodecahydro - 5H - 4aβ,6aα,11aα-pyrido[1,2-a][1,6]naphthyridin-5β-ol.

15. A compound according to claim 1 that is: dl-3-(2-methylallyl)dodecahydro - 5H - 4aβ,6aα,11aα-pyrido-[1,2-a][1,6]naphthyridin-5β-ol.

16. A compound according to claim 1 that is: dl-dodecahydro - 3 - (3-methyl-2-butenyl)-5H-4aβ,6aα,11aα-pyrido[1,2-a][1,6]naphthyridin-5β-ol.

17. A compound according to claim 1 that is: 3-benzoyldodecahydro - 5H - pyrido[1,2-a][1,6]naphthyridin-5-one.

18. A compound according to claim 1 that is: 3-benzyl-5H - 4aβ,6aα,11aα - dodecahydro - pyrido[1,2-a][1,6]naphthyridin-5α-ol.

References Cited

UNITED STATES PATENTS 3,346,581   10/1967   Gootjes ......... 260—294.7C

HENRY R. JILES, Primary Examiner

S. D. WINTERS, Assistant Examiner

U.S. Cl. X.R.

260—294, 294.3, 294.7; 424—267